United States Patent Office 2,941,728
Patented June 21, 1960

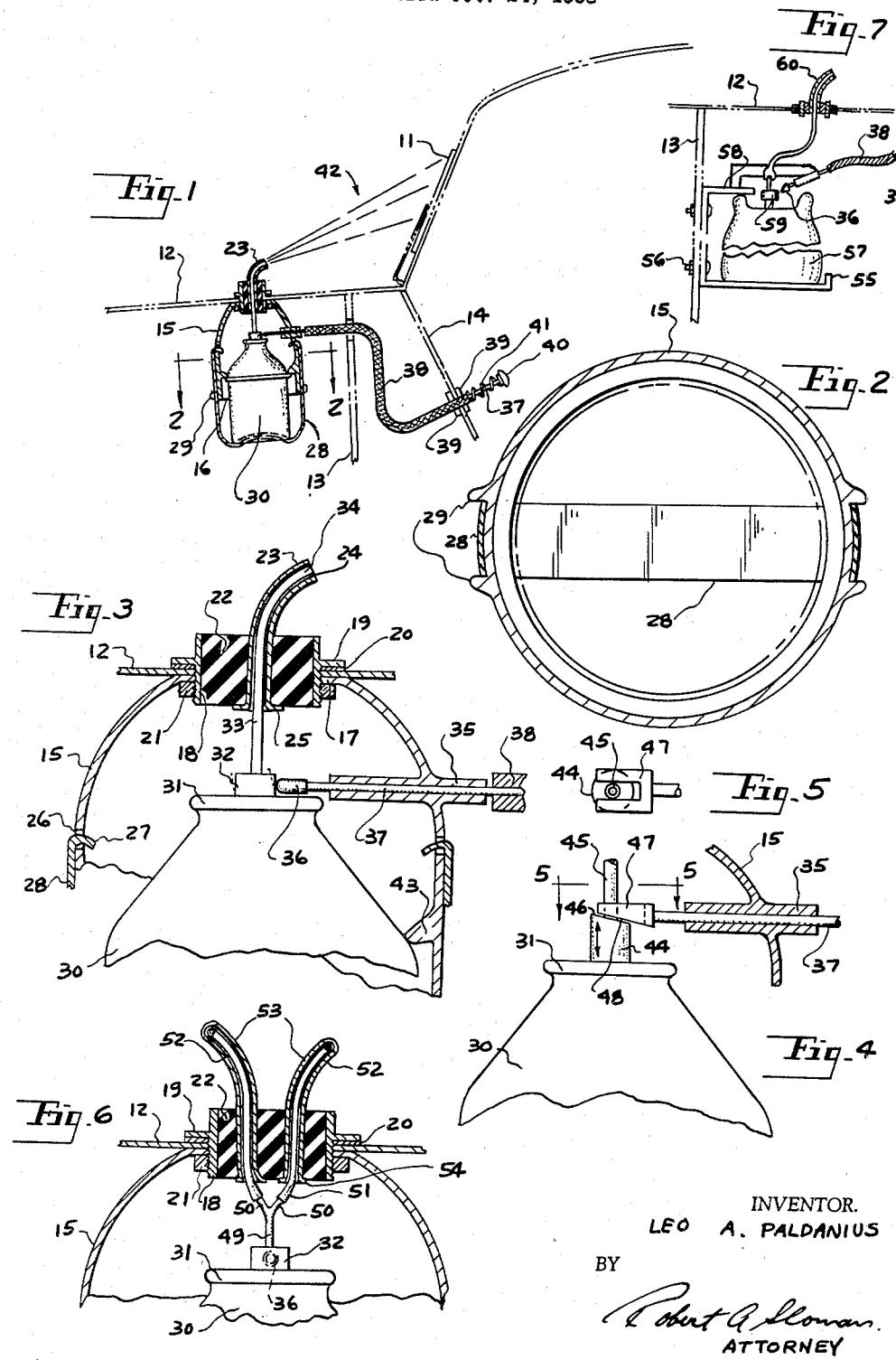
June 21, 1960 — L. A. PALDANIUS — 2,941,728
WINDSHIELD WASHER
Filed Oct. 24, 1958
INVENTOR.
LEO A. PALDANIUS
BY
Robert A. Sloman
ATTORNEY

2,941,728

WINDSHIELD WASHER

Leo A. Paldanius, Rte. 2, 11th St., Port Huron, Mich.

Filed Oct. 24, 1958, Ser. No. 769,407

7 Claims. (Cl. 239—284)

This invention relates to vehicle windshield washers and more particularly to the use of a prefilled pressurized disposable cleaning fluid container for use therewith.

It is the object of the present invention to provide with a vehicle having a body, windshield and dashboard, a guide nozzle projecting up through the body extending towards said windshield, and removably connected to said nozzle, an aerosol container of cleaning fluid.

It is another object to provide a remote manual control on the vehicle dashboard for unseating the valve of the aerosol container, by which a stream of fluid is projected through the nozzle.

It is another object to supportably mount a receiver within the vehicle body in registry with the guide nozzle by which the removable and interchangeable aerosol container may be supported with an elongated outlet projected up into said nozzle.

It is a further object to provide at least a pair of commonly connected nozzles upon the body joined to the container outlet whereby at least a pair of streams of fluid may be delivered to the vehicle windshield. Alternately, a pair of separate nozzles, receivers and aerosol containers may be employed with separate valve operators and a common dashboard control therefor.

It is a further object herein to provide a simple and economical windshield washer which includes the use of disposable easily replaceable aerosol type containers which are factory filled with the correct formulation which will not freeze and wherein the windshield washer is operable independent of the vehicle engine and operates effectively regardless of the altitude. This assures a fluid free of dirt or foreign particles.

These and other objects will be seen from the following specification and claims in conjunction with the appended drawing in which:

Fig. 1 is a fragmentary schematic view of a portion of a vehicle, including a body, windshield, firewall and dashboard with present window washer associated therewith.

Fig. 2 is a section taken on line 2—2 of Fig. 1, on an enlarged scale.

Fig. 3 is a fragmentary elevational section of the receiver, guide nozzle and removable pressurized cartridge, on an increased scale.

Fig. 4 is a fragmentary partially sectioned view corresponding to Fig. 3 illustrating a different form of valve control.

Fig. 5 is a fragmentary section taken on line 5—5 of Fig. 4.

Fig. 6 is a fragmentary section similar to Fig. 3 illustrating the use of a plurality of nozzles connected to a single aerosol container.

Fig. 7 is a fragmentary diagrammatic view similar to Fig. 1, showing a different type of bracket mounting for the aerosol container.

It will be understood that the above drawing illustrates merely a preferred embodiment of the invention and that other embodiments are contemplated within the scope of the claims hereafter set forth.

Referring to the drawing, Fig. 1, illustrates diagrammatically the forward section of a vehicle, including windshield 11, body 12, firewall 13 and dashboard 14.

In the preferred embodiment of the invention, there is shown in Fig. 1, one means of effectively mounting the removable and interchangeable aerosol container 30 which contains a predetermined factory filled formulation suitable for cleaning windows.

The particular formulation forms no part of the present invention. However, an illustration, for example, would be a 50–50 mixture of water and alcohol with the use of compressed Freon gas as a propellent. Freon is the trademark of Dupont Company.

It is understood that many formulations, solvents and detergents, not part of this invention, may be employed.

Referring to Figs. 1 and 3, there is employed a dome-shaped receiver 15 open at its lower end at 16 and including a centrally apertured top wall 17 through which projects the externally threaded tube 18.

Upon assembly, the tube 18, having annular flange 19 is projected down through a corresponding aperture in body 12 with a suitable gasket 20 between said flange and body. The threaded end of tube 18 extends down into receiver 15 and is fixedly connected thereto by nut 21 to provide a rigid assembly within and upon the vehicle body.

Said receiver is thus supported by tube 18 which extends through the cowl of the vehicle body and may be bolted to either the driver's side or engine side of firewall 13 as desired. Centrally apertured rubber sleeve 22 is fixedly nested in tube 18 and projecting upwardly therethrough is an arcuate guide sleeve 23 having an outlet 24 arranged forwardly of and extending toward windshield 11.

Sleeve 23 is of a bendable metal such as aluminum, for illustration, and directs the stream 42 towards said windshield. The lower end of sleeve 23 is flanged at 25 for anchoring the same relative to sleeve 22.

Receiver 15 upon opposite sides has formed therethrough a pair of slots 26 adapted to supportably receive the inturned ends 27 of the substantially U-shaped spring bail 28 adapted to support the aerosol fluid container 30 as shown in Fig. 1.

Said receiver has outwardly projecting guide bosses 29, Fig. 2, in pairs upon its opposite sides for receiving and locating bail 28, maintaining the same in an upright position for normal use. Said bail is sufficiently flexible and is so mounted that it may be easily displaced manually from bosses 29 to permit removal and replacement of aerosol container 30.

Said container has an outlet 31 at its upper end normally closed by the upwardly projecting valve element 32 which, in the position shown in Fig. 3, sealingly closes said container in a conventional and well-known manner forming no part of the present invention. No claim is made to the specific structure of the aerosol container and its valve control.

These aerosol containers have various types of valve mechanisms which are normally spring-biased to closed position.

One of these shown in Fig. 3 is a tip-type of valve 32 which upon application of a lateral tipping force as by the plunger 36 will become unseated. This provides a flow of propelled fluid through the connected upwardly extending preferably plastic nozzle 33 loosely and guidably projected up through sleeve 23. Outlet 34 of nozzle 33 is arranged adjacent the open end of tube 23.

Receiver 15 has the transversely arranged apertured guide 35 adapted to slidably receive flexible pushrod 37 mounting plunger 36. Said rod is guidably positioned within an elongated guide tube 38 which extends from adjacent receiver 15 through firewall 13 and through a corresponding opening in dashboard 14 to which it is fixedly secured at 39, Fig. 1. Pushrod 37 projects outwardly of guide 38 terminating in pushbutton 40.

Compression spring 41 is interposed between said pushbutton and dashboard 14 normally maintaining the pushrod and plunger 36 in the inoperative position shown in Figs. 1 and 3.

Pushbutton 40 may be located so as to be operated either by hand or foot. In any event, inward projection of button 40 will cause a corresponding slight lateral displacement or tipping of valve 32 sufficient to provide for the outflow under pressure of a stream of cleaning fluid as shown at 42, Fig. 1.

An internal annular boss 43 is arranged fixedly upon the interior of receiver 15 to retainingly receive the upper portion of container 30 in cooperation with bail 28 for securing said aerosol container within the receiver as shown in Fig. 1.

Another form of valve 44 is shown in Fig. 4, which is limited to up and down movements, and may be cam operated. Valve 44 has a similar plastic outlet nozzle 45 corresponding to nozzle 33 described in connection with Fig. 3.

The top surface of valve 44 is tapered at 46 and is adapted for operative engagement by the similarly tapered undersurface 48 of cam plunger 47 secured upon the end of a similar flexible pushrod 37 which extends into receiver 15 through apertured guide 35.

Both valves 32 and 44 have the same type of remote control 40 on vehicle dashboard 14. As shown in Fig. 5, cam plunger 47 is bifurcated so as to loosely extend around nozzle 45.

A slight variation is shown in Fig. 6 wherein there are provided a pair of flexible nozzle receiving guide sleeves for connection to a single aerosol container 30.

Apertured valve 32 invludes Y-shaped outlet 49 with the respective branches 50 projected at 51 within the lower ends of the flexible plastic nozzles 52 which loosely extend up through arcuate guide sleeves 53 anchored at 54 within flexible closure sleeve 22.

By this structure and employing a single pushrod plunger 36 as above described, two fluid streams may be directed, for example, to windshield 11 and adjacent wipers.

A slight variation is shown in Fig. 7 wherein the aerosol container 57 is mounted upon bracket 55 secured at 56 upon one side of firewall 13, further employing the retaining clip 58.

Normally closed valve 59 is unseated by plunger 36 under operation of a remote control 37—40, the same as above described in connection with Fig. 1. The valve 59 has a similar flexible outlet nozzle corresponding to nozzle 33 of Fig. 3 which loosely projects through the formed guide sleeve 60 on vehicle body 12 directed toward windshield 11. Bracket 55 may be on either side of firewall 13.

Having described my invention reference should now be had to the following claims:

I claim—

1. In a cleaning system for a windshield, a first support, a formed guide sleeve projecting up through said first support and extending toward said windshield, a mounting bracket secured to said first support, an interchangeable pressurized aerosol container of window cleaning fluid supportably mounted by said bracket, said container including an apertured normally closed movable valve, an upwardly extending flexible nozzle on said valve projected through said sleeve, a reciprocally movable plunger engageable with said valve for unseating the same, a second support, and a reciprocally movable remote manual control joined at one end to said plunger and at its other end extending through said second support.

2. The windshield washer of claim 1, said bracket consisting of an upright dome-shaped receiver for said container secured to and depending from said first support in axial registry with said guide sleeve, and flexible means depending from said receiver supportably engaging said container.

3. The windshield washer of claim 1, said bracket consisting of an upright dome-shaped receiver secured to and depending from said first support, a flexible centrally apertured sealing sleeve secured within said first support, said guide being secured to and projecting up through said sealing sleeve.

4. The windshield washer of claim 1, said bracket consisting of an upright dome-shaped receiver for said container secured to and depending from said first support in axial registry with said guide sleeve, and a flexible U-shaped bail swingably depending from said receiver supportably engaging said container.

5. The windshield washer of claim 1, said remote control consisting of an elongated flexible pushrod, a pushbutton at one end of said rod, and a compression spring on said rod between said second support and said button normally maintaining said remote control in inoperative position.

6. In a cleaning system for a windshield, a first support, a pair of formed guide sleeves projecting up through said first support, and extending toward portions of said windshield, a mounting bracket secured to said first support, an interchangeable pressurized aerosol container of window cleaning fluid supportably mounted by said bracket, said container including an apertured normally closed movable valve, an upwardly extending Y-shaped flexible nozzle on said valve with its respective branches loosely projected up through said sleeves, a reciprocally movable plunger engageable with said valve for unseating the same, a second support, and a reciprocally movable remote control joined at one end to said plunger and at its other end extending through said second support.

7. In a cleaning system for a windshield, a first support, a formed guide sleeve secured to and projecting up through said first support spaced from and extending toward said windshield, a second support, a mounting bracket secured to said second support, an interchangeable pressurized aerosol container of a window cleaning fluid supportably mounted by said bracket, said container including an apertured normally closed movable valve, an upwardly extending flexible nozzle on said valve projected through said sleeve, a reciprocally movable plunger engageable with said valve for unseating the same, a third support, and a reciprocally movable remote control joined at one end to said plunger and at its other end extending through said third support.

References Cited in the file of this patent

UNITED STATES PATENTS

| 2,701,897 | Laming | Feb. 15, 1955 |
| 2,765,959 | Elliott | Oct. 9, 1956 |
| 2,797,131 | Parkes | June 25, 1957 |
| 2,866,472 | Risely | Dec. 30, 1958 |